(12) United States Patent
Tauser et al.

(10) Patent No.: US 7,202,993 B2
(45) Date of Patent: Apr. 10, 2007

(54) PRODUCTION OF TUNEABLE PICOSECOND LIGHT PULSES IN A VISIBLE SPECTRAL RANGE

(75) Inventors: Florian Tauser, München (DE); Alfred Leitenstorfer, Constance (DE); Frank Lison, Gauting (DE)

(73) Assignee: Toptica Photonics AG, Graefelfing (DE)

( * ) Notice: Subject to any disclaimer, the term of this patent is extended or adjusted under 35 U.S.C. 154(b) by 35 days.

(21) Appl. No.: 10/540,822

(22) PCT Filed: Feb. 25, 2004

(86) PCT No.: PCT/EP2004/001855

§ 371 (c)(1),
(2), (4) Date: Jun. 23, 2005

(87) PCT Pub. No.: WO2004/077142

PCT Pub. Date: Sep. 10, 2004

(65) Prior Publication Data

US 2006/0146898 A1    Jul. 6, 2006

(30) Foreign Application Priority Data

Feb. 25, 2003    (DE) ................. 103 08 249

(51) Int. Cl.
 G02F 2/02    (2006.01)
 H01S 3/108    (2006.01)

(52) U.S. Cl. ............... 359/326; 372/20; 372/21

(58) Field of Classification Search ........ 359/326–332; 372/20–22
See application file for complete search history.

(56) References Cited

U.S. PATENT DOCUMENTS

| | | | |
|---|---|---|---|
| 6,181,463 B1 * | 1/2001 | Galvanauskas et al. ...... | 359/330 |
| 6,208,458 B1 * | 3/2001 | Galvanauskas et al. ...... | 359/345 |
| 6,618,531 B1 * | 9/2003 | Goto et al. ............... | 385/122 |
| 6,813,423 B2 * | 11/2004 | Goto et al. ............... | 385/122 |
| 6,925,236 B2 * | 8/2005 | Goto et al. ............... | 385/122 |

(Continued)

FOREIGN PATENT DOCUMENTS

EP    1 118 904 A1    7/2001

OTHER PUBLICATIONS

Klein et al, "Rapid Infrared Wavelength Access With A Picosecond PPLN OPO Synchronously Pumped By A Mode-Locked Diode Laser", Appl. Phys. B, vol. 73, No. 1, Jul. 2001, pp. 1-10.*

(Continued)

*Primary Examiner*—John D. Lee
(74) *Attorney, Agent, or Firm*—Collard & Roe, P.C.

(57) ABSTRACT

The invention relates to a device for the production of tuneable light impulses in a visible spectral range, comprising a laser system (LS) which emits femtosecond light impulses in the infrared spectral range, and an optical frequency converter (FC) for converting the wave lengths of the light impulses into the visible spectral range. According to the invention, the wave length of the light impulse emitted by the laser system can be tuned in order to provide said type of device which can be used as a light source for time-resolved fluorescence spectroscopy. Said device also comprises an optical stretcher which enables the duration of the impulse of the frequency converted light impulse to be increased to at least 1 ps.

14 Claims, 1 Drawing Sheet

U.S. PATENT DOCUMENTS

Figure 1:
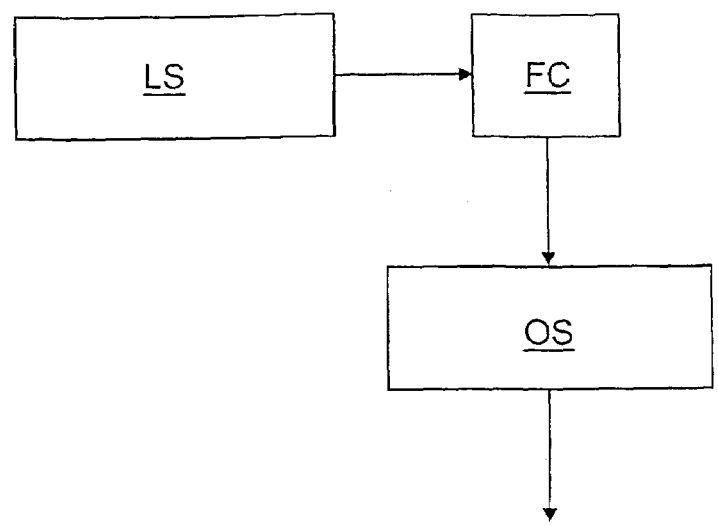

2005/0238070 A1* 10/2005 Imeshev et al. .............. 372/21

OTHER PUBLICATIONS

Hugonnot et al, "Amplified Femtosecond Laser System Based On Continuum Generation And Chirped Pulse Parametric Amplification", Advanced Solid-State Photonics, Paper MC3, 2004, 3 pages.*

"Experimental evidence for supercontinuum generation by fission of higher-order solitons in photonic fibers" Herrmann J. et al, Physical Review Letters, vol. 88, No. 17, Mar. 29, 2002, pp. 1 73901-1-173901-4.

"Superconinuum generation of higher-order solitons by fission in photonic crystal fibers", Husakou A. V. et al, Physical Review Letters, vol. 87, No. 20, Nov. 12, 2001, pp. 203901-1-203901-4.

"Efficient generation of narrow-bandwidth picosecond pulses by frequency doubling of femtosecond chirped pulses", Raoult F. et al. Optics Letters, vol. 23, No. 14, Jul. 15, 1998, pp. 1117-1119.

"Widely tunable sub-30-fs pulses from a compact erbium-doped fiber source", Tauser R. Adler F, Leitenstorfer A, Optics Letters, vol. 29, No. 5, Mar. 1, 2004, pp. 516-518.

* cited by examiner

PRODUCTION OF TUNEABLE PICOSECOND LIGHT PULSES IN A VISIBLE SPECTRAL RANGE

CROSS REFERENCE TO RELATED APPLICATIONS

Applicants claim priority under 35 U.S.C. §119 of German Application No. 103 08 249.2 filed on Feb. 25, 2003. Applicants also claim priority under 35 U.S.C. §365 of PCT/EP2004/001855 filed on Feb. 25, 2004. The international application under PCT article 21(2) was not published in English.

The invention relates to a device for the production of tunable picosecond light pulses in the visible spectral range, having a laser system that emits femtosecond light pulses in the infrared spectral range, and having an optical frequency converter for converting the wavelengths of the light pulses into the visible spectral range.

Laser systems that are able to produce femtosecond light pulses are increasingly being used in basic physical research and also in other areas of research. Using such laser systems, it is possible to observe fast physical, chemical, and biological processes essentially in "real time." Commercial areas of use for laser systems that produce femtosecond light pulses exist in the fields of material studies and material processing, in the field of medicine, as well as in the field of the so-called "life sciences." Concrete applications that can be mentioned as examples are multi-photon microscopy as well as optical coherence tomography.

In the more recent past, so-called time-resolved fluorescence spectroscopy has also developed into an important investigation method in the fields of chemistry, biochemistry, physical chemistry, and also semiconductor technology. In the case of time-resolved fluorescence spectroscopy, the lifetime of an excited state of a fluorophor that is used is determined. This is the average time that an individual fluorophor molecule spends in the excited state, before it returns to the basic state, emitting a fluorescence photon. The lifetime is specific for the fluorophor and its local surroundings, in each instance, so that the fluorophor molecules are used as probes, so to speak, to examine the microscopic processes that are of interest. Using different lifetimes, it is also possible, for example, to differentiate between two or more different fluorophors with overlapping absorption spectra or emission spectra, thereby further improving the usage possibilities. Such studies are used, for example, in an automated search for active substances (HTS, English "high throughput screening").

In time-resolved fluorescence spectroscopy, fluorophors whose lifetime lies in the range between several 100 ps and a few 100 ns are generally used as so-called markers. A short lifetime is generally advantageous, since a low signal noise can be achieved by means of repeated measuring and averaging. At the same time, the short lifetimes result in high requirements with regard to the pulse length of the light pulses that are radiated in to excite the fluorophors. In any case, the pulse length must be short as compared with the lifetime of the fluorophors. It must furthermore be taken into consideration that the excitation spectra of the fluorophors that are used in practice essentially lie in the visible spectrum range. The number of the fluorophors that can be used for time-resolved fluorescence spectroscopy for certain study objects is generally greatly limited by the experimental surroundings and by the specific interactions with the study object, so that there are restrictions with regard to the wavelength of the light pulses.

Proceeding from this, the present invention is based on the task of making available a light source, particularly for time-resolved fluorescence spectroscopy, which produces the light pulses having a pulse duration in the picosecond range, whereby the wavelength of the light pulses is supposed to be tuneable, essentially over the entire visible spectral range.

The present invention accomplishes this task, proceeding from a device of the type stated initially, in that the wavelength of the light pulses emitted by the laser system can be tuned, and that an optical stretcher is provided, by means of which the pulse duration of the frequency-converted light pulses can be increased to at least 1 ps.

According to the invention, therefore, femtosecond light pulses are first produced in the infrared spectral range, using a suitable laser system, which have a sufficiently high pulse energy (on the order of nanojoules), so that the wavelength of the light pulses can be converted to the desired visible spectral range, using corresponding non-linear optical effects, by means of a frequency converter of a known type. The frequency-converted light pulses are then brought to the desired pulse duration of up to 1000 ps, by means of an optical stretcher, according to the invention. For time-resolved fluorescence spectroscopy, light pulses having a pulse duration in the range from 1 ps to 1000 ps are required. For most applications, light pulses having a pulse duration in the range between 10 and 100 ps are required. The repetition rate of the light pulses should lie in the range of up to 250 MHz.

The device according to the invention is, of course, also suitable as a tuneable light source that provides quasi-continuous laser light for normal, i.e. not time-resolved fluorescence spectroscopy.

The frequency converter used according to the invention can comprise one or more frequency doubler(s) of a usual type. For example, commercially available SHG crystals (English "second harmonic generation") or also so-called periodically poled crystals or suitable wave guide structures can be used as frequency doublers.

Furthermore, in the case of the device according to the invention, an optical frequency filter can be provided, which is switched either ahead of or after the frequency converter. The non-linear optical element for frequency conversion of the light pulses into the visible spectral range that is used, depending on the application case, can furthermore fulfill the function of the optical stretcher and the frequency filter. The frequency conversion generally takes place in narrow-band manner, due to the phase adaptation conditions that must be adhered to for frequency doubling, and this is equivalent to spectral filtering of the frequency-converted light. Because of the narrow band, time stretching of the light pulses also occurs, in most cases.

Accordingly, a separate optical element that fulfills the function of the optical stretcher does not necessarily have to be provided for the device, depending on the non-linear optical element for frequency conversion that is used.

It is practical if the wavelength of the light pulses that are emitted by the laser system is tuneable in a sufficiently large range, if possible at least between 1 μm and 2 μm, so that a sufficiently great tuneability, if possible in the entire visible spectral range, is obtained for the frequency-converted light pulses. Ideally, the laser system can be tuned to such an extent that the entire visible spectral range plus the adjacent ultraviolet (UV) and near infrared (NIR) spectral range can be covered by means of frequency conversion according to the invention. If a simple frequency doubler is used as a frequency converter, according to the invention, a spectral coverage at the output of the device according to the invention between 400 nm and 1 µm is obtained at a tuneability of the wavelength of the light pulses emitted by the laser system between 800 nm and 2 µm, so that almost the entire visible spectral range, including the near infrared spectral range, is covered.

It is practical if the optical stretcher of the device according to the invention is formed by at least one dispersive optical element that is switched after the frequency converter. The optical stretcher can also be configured in multiple stages and consist, for example, of a glass rod after which a dispersive glass fiber is switched. In the first stage, an increase in the pulse duration of the frequency-converted light pulses from approximately 100 fs to approximately 1 ps can take place, while in the second stage, the pulse duration is increased further from 1 ps to the desired 10 to 100 ps. In total, for time-resolved frequency spectroscopy, the pulse duration of the frequency-converted light pulses should be adjustable in the stated range. In this connection, it should be taken into consideration that as a rule, an average spectral power density of more than 1 mW per nanometer, preferably more than 10 mW per nanometer, is needed for time-resolved fluorescence spectroscopy.

According to the invention, a laser system that emits both high-power light pulses as well as spectrally variable light pulses in the infrared spectral range is needed. This laser system should be inexpensive and easy to operate, particularly for use in the field of time-resolved fluorescence spectroscopy.

Until now, high-power femtosecond light pulses were generated in the laboratory, usually using titanium/sapphire laser systems. It is a disadvantage that these systems are very expensive, complicated to adjust, and difficult to handle. Also, the tuneability of the optical spectrum of the light pulses produced by such laser systems is not satisfactory.

Nowadays, it is increasingly common to produce femtosecond light pulses having pulse energies of a nanojoule and more by means of purely fiber-based laser systems. Such systems usually consist of a pulsed laser light source, which emits femtosecond light pulses in an energy range of 100 picojoules. These light pulses are then amplified by means of an optically pumped amplifier fiber, so that the light pulses are available in the desired pulse energy range.

A device for producing tuneable light pulses is known, for example, from EP 1 118 904 A1. The known device works with a special non-linear optical fiber, by means of which the optical spectrum of femtosecond light pulses, which are supplied by a suitable pulsed laser light source, can be modified in targeted manner, utilizing solitonic effects and the Raman effect. To vary the spectrum of the light pulses that are produced, the intensity of the light coupled into the non-linear optical fiber is varied, in the case of the system described in the stated reference. This directly results in the disadvantage that in the case of the previously known system, the desired optical spectrum of the light pulses that are produced depends on the pulse energy. An independent variation of the pulse energy and the wavelength of the light pulses is therefore not possible with the previously known system. Another disadvantage is that in the case of the previously known system, the non-linear optical fiber that is used must have a length of several 10 m in order for the desired Raman effect to become effective to a sufficient degree. Because of the long running distance, an undesirable coherence loss of the light pulses that are produced can occur.

To avoid the outlined disadvantages, a laser system that has a non-linear optical fiber for the production of the tuneable light pulses can be used in the device according to the invention, by means of which fiber the optical spectrum of femtosecond light pulses can be modified using purely solitonic effects, whereby an optical compressor is switched after the non-linear optical fiber.

It has been shown that non-linear processes in the fiber into which the light pulses are coupled in the case of the laser system of the device according to the invention result in the formation of two separate light pulses in the fiber, the spectrum of which is shifted towards the long-wave spectral range and the short-wave spectral range, respectively, as compared with that of the light pulse that was coupled in. In this connection, the spectral separation of the light pulses is adjustable by means of the optical compressor that is switched ahead of the non-linear optical fiber in the case of the device according to the invention. By means of the optical compressor, the time/frequency behavior (English "chirp") of the light pulses that are coupled in is influenced in targeted manner. The optical spectrum that is modified by means of the non-linear fiber is then sensitively dependent on the predetermined "chirp," so that the desired tuneability of the light pulses is present. It is particularly advantageous that the optical spectrum of the light pulses produced by means of the device according to the invention can be varied independent of the pulse energy.

In experiments, it has been shown that the laser system of the device according to the invention advantageously makes do with a very short non-linear optical fiber having a length of only a few centimeters, for the desired modification of the optical spectrum of the light pulses. In this way, coherence losses of the light pulses that are produced are effectively avoided.

The light pulses that are coupled into the non-linear optical fiber of the laser system should have a pulse energy of at least one nanojoule. Such high pulse energies are desirable so that the solitonic optical effects occur within the non-liner optical fiber to a sufficient degree, so as to produce the tuneable light pulses.

It is practical if the optical compressor of the laser system of the device according to the invention is configured to be adjustable, in such a manner that the time/frequency progression of the light pulses coupled into the non-linear optical fiber can be modified. This makes it possible to tune the light pulses that are produced to the desired wavelengths, in convenient and simple manner, in that the adjustable elements of the optical compressor, such as prisms or optical lattices, for example, are adjusted in suitable manner.

According to an advantageous embodiment of the device according to the invention, the non-linear optical fiber is configured to maintain polarity and shift dispersion. Such a fiber is described, for example, in the article by T. Okuno et al. in the IEEE Journal of Selected Topics of Quantum Electronics, Vol. 5, p. 1385, 1999. The solitonic optical effects that are mentioned, which result in the desired modification of the spectrum of the light pulses, according to the invention, occur in the non-linear optical fiber when the wavelength of the light pulses coupled into the fiber lies in the range of the zero dispersion wavelength of the fiber. In experiments, a non-linear optical fiber whose zero dispersion wavelength lies in the range of 1.52 µm was used to produce the tuneable light pulses.

Light pulses having a particularly broad optical spectrum can be produced with the laser system of the device according to the invention, if the non-linear optical fiber has a particularly small core diameter of $\leq 5$ µm. In experiments, a fiber having a core diameter of 3.7 µm was successfully used, whereby a fiber length of only 7 cm proved to be sufficient. This results in a usable wavelength range for tuning the light pulses that extends from approximately 1.1 μm to 2.0 μm.

Aside from conventional optical glass fibers, microstructured photonic fibers can also be used as the non-linear optical fiber to produce the tuneable light pulses, according to the invention. Such fibers have a transversal microstructure in the region of the core. By means of a suitable adaptation of the zero dispersion wavelength as well as by means of a small core diameter and thereby a high non-linearity of such crystal fibers, it is possible to produce light pulses that can be tuned in a wide range, according to the invention.

Optionally, in the case of the laser system of the device according to the invention, an additional optical compressor can be switched after the non-linear optical fiber, in order to achieve light pulses having a minimal pulse duration at the output of the laser system. In experiments, the use of a prism compressor using prisms made of SF10 glass has proven itself. It was possible to achieve pulse durations of $\leq 25$ fs with this.

Exemplary embodiments of the invention will be explained in the following, using the figures. These show:

FIG. 1 representation of the device according to the invention as a block diagram.

Figure 2:
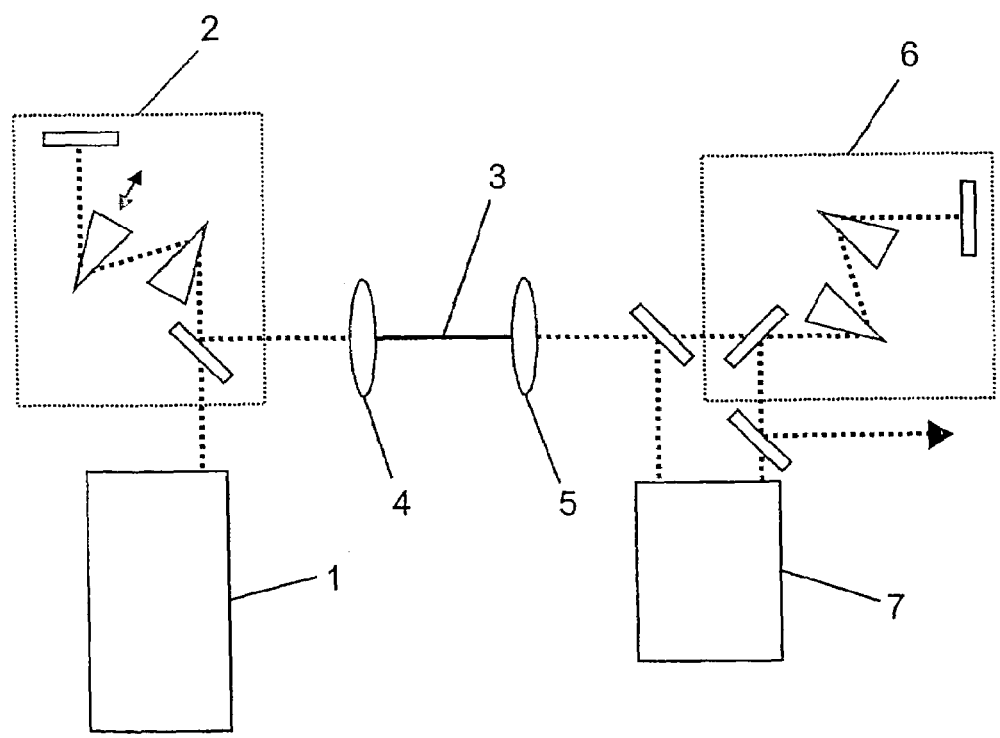

FIG. 2 laser system of the device according to the invention.

The device shown in FIG. 1 consists of a laser system LS, which emits femtosecond light pulses in the infrared spectral range. These light pulses are passed to an optical frequency converter FC, which can be a frequency doubler crystal of a known type, for example. The frequency-converted light pulses are passed to an optical stretcher OS, by means of which the pulse duration of the frequency-converted light pulses can be increased to at least 1 ps. As needed, an optical frequency filter, not shown in detail in FIG. 1, can be switched ahead of or after the frequency converter FC, in order to be able to eliminate undesirable spectral components in the optical spectrum of the light pulses. According to the invention, the wavelength of the light pulses emitted by the laser system LS is tuneable. In this connection, a tuneability between 1 μm and 2 μm, if possible even between 800 nm and 2 μm, should be guaranteed, so that light pulses that are essentially tuneable over the entire visible spectral range are available at the output of the device shown in FIG. 1. The optical stretcher OS can be any desired dispersive optical element, such as a glass rod or an optical fiber having a suitable dispersion, or a multi-stage structure of such elements, for example.

FIG. 2 schematically shows the structure of the laser system LS of the device shown in FIG. 1. In this connection, a pulsed laser light source 1 is provided, which emits femtosecond light pulses having a pulse energy of more than one nanojoule. The laser light source 1 can advantageously be a completely fiber-based system, which is composed of a commercially available pulsed fiber laser and an optically pumped amplifier fiber that is switched after it. The use of usual free-beam lasers as the laser light source 1 is also possible, however. The time/frequency progression of the light pulses emitted by the laser light source 1 is predetermined, in targeted manner, by means of a prism compressor 2. In the case of the exemplary embodiment shown, the light pulses run through the prism arrangement twice for this purpose. The double arrow indicates that one of the prisms of the compressor is adjustable, in order to thereby be able to tune the light pulses that are produced according to the invention. A non-linear optical fiber 3 that shifts dispersion and maintains polarity is switched after the prism compressor 2, and the light is coupled into that fiber by means of a lens 4. The light pulses coupled into the fiber 3 have a wavelength that essentially corresponds to the zero dispersion wavelength of the optical fiber 3. Due to the non-linear solitonic effects that occur in the fiber 3, the optical spectrum of the light pulses is greatly modified. The light pulses that exit from the optical fiber 3, which are coupled out by means of another lens 5, have an optical spectrum that is sensitively dependent on the "chirp" predetermined by means of the compressor 2. By adjusting the corresponding prism in the compressor 2, the light pulses that exit from the fiber 3 can be adjusted in the infrared wavelength range, between 1.1 μm and 2.0 μm. As described above, the optical spectrum of the light pulses at the output of the fiber 3 has two separate components, which are shifted towards the long-wave spectral range and the short-wave spectral range, respectively, as compared with the wavelength of the light pulse that was coupled in. An adjustable spectral separation of the two components by more than 100 THz can be achieved with the structure shown. Even though a short non-linear optical fiber, which can have a length of $\leq 10$ cm, is sufficient, according to the invention, the light pulses run dispersively apart within the fiber 3. This can be compensated by means of an additional prism compressor 6. When using SF10 glass prisms, tuneable light pulses having a pulse duration of $\leq 25$ fs were implemented with the structure shown in the drawing. To characterize the light pulses, a FROG structure or a spectrometer 7 is provided.

It must be pointed out that to achieve a targeted adjustment of the "chirp" of the light pulses coupled into the fiber 3, other dispersive optical components can also be used instead of the prism compressor 2, such as lattice compressors, so-called "chirped" mirrors, fiber Bragg lattices, additional dispersive optical path segments, etc., for example.

The invention claimed is:

1. Device for the production of tuneable picosecond light pulses in the visible spectral range, having a laser system (LS) that emits femtosecond light pulses in the infrared spectral range, and having an optical frequency converter (FC) for converting the wavelengths of the light pulses into the visible spectral range, wherein the wavelength of the light pulses emitted by the laser system (LS) can be tuned, whereby the conversion of the wavelength of the light pulses by means of the frequency converter takes place in such a manner that the wavelength of the light pulses in the visible spectral range can be tuned, whereby an optical stretcher (OS) is provided, by means of which the pulse duration of the frequency-converted light pulses can be increased to at least 1 ps.

2. Device according to claim 1, wherein the frequency converter (FC) comprises one or more frequency doubler(s).

3. Device according to claim 1, comprising at least one optical frequency filter that is located either ahead of or after the frequency converter (FC).

4. Device according to claim 1, wherein the wavelength of the light pulses emitted by the laser system (LS) can be tuned at least in the range between 1 μm and 2 μm.

5. Device according to claim 1, wherein the optical stretcher (OS) is formed by at least one dispersive optical element that is located after the frequency converter (FC).

6. Device according to claim 1, wherein the laser system has a non-linear optical fiber (3) for the production of the tuneable light pulses, by means of which the optical spectrum of femtosecond light pulses can be modified using solitonic effects, whereby an optical compressor (2) is located after the non-linear optical fiber (3).

7. Device according to claim 6, wherein the light pulses that are coupled into the non-linear optical fiber (3) have a pulse energy of at least one nanojoule.

8. Device according to claim 6, wherein the optical compressor (2) is configured to be adjustable, in such a manner that the time/frequency progression of the light pulses coupled into the non-linear optical fiber (3) can be modified.

9. Device according to claim 6, wherein the non-linear optical fiber (3) maintains polarity and/or shifts dispersion.

10. Device according to claim 6, wherein the non-linear optical fiber (3) has a core diameter of less than five micrometers.

11. Device according to claim 6, wherein the non-linear optical fiber (3) is configured as a microstructured photonic fiber.

12. Device according to claim 6, wherein the length of the non-linear optical fiber (3) is less than one meter.

13. Device according to claim 6, comprising an additional optical compressor (6) that is located after the non-linear optical fiber (3).

14. Use of a device according to claim 1 for microscopy, con-focal microscopy, fluorescence spectroscopy, or the automated search for active substances.

* * * * *